(12) United States Patent
Kshirsagar et al.

(10) Patent No.: US 8,180,716 B2
(45) Date of Patent: May 15, 2012

(54) METHOD AND DEVICE FOR FORECASTING COMPUTATIONAL NEEDS OF AN APPLICATION

(75) Inventors: Madhukar Kshirsagar, Morganville, NJ (US); Muhammad Azam, Tinton Falls, NJ (US); Angelo Estela, Middletown, NJ (US); Ajay Joshi, Middletown, NJ (US); David Lu, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1087 days.

(21) Appl. No.: 12/077,974

(22) Filed: Mar. 24, 2008

(65) Prior Publication Data
US 2009/0240476 A1 Sep. 24, 2009

(51) Int. Cl.
*G06F 11/30* (2006.01)
*G06F 11/34* (2006.01)

(52) U.S. Cl. .......................... 706/17; 702/186
(58) Field of Classification Search ............... 706/17
See application file for complete search history.

(56) References Cited

U.S. PATENT DOCUMENTS

| | | | |
|---|---|---|---|
| 5,655,081 A | 8/1997 | Bonnell et al. | |
| 5,796,633 A | 8/1998 | Burgess et al. | |
| 5,958,010 A | 9/1999 | Agarwal et al. | |
| 6,108,782 A | 8/2000 | Fletcher et al. | |
| 6,477,667 B1 | 11/2002 | Levi et al. | |
| 6,643,613 B2 | 11/2003 | McGee et al. | |
| 6,754,705 B2 | 6/2004 | Joiner et al. | |
| 6,792,455 B1 | 9/2004 | DeLuca et al. | |
| 6,799,147 B1 | 9/2004 | Balasubramanian et al. | |
| 6,892,236 B1 | 5/2005 | Conrad et al. | |
| 7,110,918 B2 | 9/2006 | Celestini | |
| 7,231,442 B2 | 6/2007 | Chen | |
| 7,260,635 B2 | 8/2007 | Pandya et al. | |

OTHER PUBLICATIONS

Berman et al., Application-Level Scheduling on Distributed Heterogeneous Networks [online], 1996 [retrieved on Jul. 28, 2011]. Retrieved from the Internet:< URL: http://citeseerx.ist.psu.edu/viewdoc/download?doi=10.1.1.125.5499&rep=rep1&type=pdf>.*
"HP SiteScope Software Data Sheet", 2007, 4 pages, Hewlett-Packard Development Company.

* cited by examiner

*Primary Examiner* — Jeffrey A Gaffin
*Assistant Examiner* — Nathan Brown, Jr.

(57) ABSTRACT

The invention comprises methods and devices of forecasting future computational needs of an application based on input load, where the application comprises a plurality of processes executed on a plurality of computing devices. The method of the invention proceeds by monitoring at least a computational load characteristic of at least a first process executed on a first computing device and a second process executed on a second computing device. A mathematical relationship between input load and the computational load characteristic is established, and future computational needs are forecasted based on the established mathematical relationship.

17 Claims, 6 Drawing Sheets

METHOD AND DEVICE FOR FORECASTING COMPUTATIONAL NEEDS OF AN APPLICATION

BACKGROUND OF THE INVENTION

Various enterprise and network monitoring systems exist in the industry. However, such systems typically monitor load on a single device or similar indicators on multiple devices. For example, a server may be used on a network and monitors may be employed which monitor CPU usage, memory usage, and the like, on the network. Similarly, such indicia may be monitored on multiple servers.

There are many drawbacks to the above methods. First, it is often not realized that more computational resources are needed to handle the volume generated by specific applications, until usage of the resources increases beyond an acceptable level. Second, it is very difficult to pinpoint which application is the primary cause of the load on the server reaching unacceptable levels. Third, when an application comprises multiple steps or processes which initiate functions across multiple servers or computing devices, the above prior art methods lack the ability to track indicia based on application.

Thus, there is a need in the industry to provide a method of monitoring computational resources by an application, especially when the application is run across multiple servers or computing devices, and the application is one of many running on such servers or devices. There is also a need to forecast future computational requirements, based on increased usage of applications.

SUMMARY OF THE INVENTION

The invention disclosed comprises a device and method for predicting future computational need of an application. The application comprises a plurality of processes. At least one process is executed on a first computing device, and at least one process is executed on a second computing device.

The method comprises the steps of monitoring a computational load characteristic of the a first process executed on the first computing device and of a second process executed on the second computing device, establishing a mathematical relationship between input load and the computational load characteristic for each of the first and second processes, and forecasting a future computational need for at least one of the first process and second processes, based on the established mathematical relationship. In an alternative embodiment, a future computational need for the application is forecast.

The device of the invention is capable of predicting future computational need for an application executed across a plurality of computing devices. The device comprises an application poller configured to receive computational load characteristic data from a plurality of processes of the application. At least one first process is executed on a first computing device, and at least one second process is executed on a second computing device. An aggregator is configured to conduct mathematical calculations on the computational load characteristic data. A correlating engine establishes a mathematical relationship between input load and the results of the mathematical calculations. Then, an enterprise computing engine is used to forecast future computational need for the application or for at least one process of the plurality of processes based on the established mathematical relationship.

Each process of the plurality of processes may be executed on a separate computing device. Further, each process may be executed in a serial manner, whereby a subsequent process does not begin until after a previous process is complete. For example, this may occur when a second process is waiting for input from a first process before beginning its task.

One or more of the computing devices used to execute a process of the application may execute the process for multiple applications. Even in such a case, the method and device of the invention allows for determining the computational load and future computational need or resources that will be required, based on the increase in input load of a single application.

The monitoring may comprise monitoring of average computational load and/or peak computational load. The mathematical relationship determined between the input load and the computational load characteristic may be a linear, logarithmic, or other relationship.

A user may be alerted when a monitored computational load characteristic exceeds a predefined threshold, and the device of the invention may comprise means for alerting a user when a monitored computational load characteristic exceeds a predefined threshold.

In specific embodiments, the monitored computational load characteristic may be cpusecs, memory usage, network usage, and/or disk usage.

DETAILED DESCRIPTION

Figure 1:
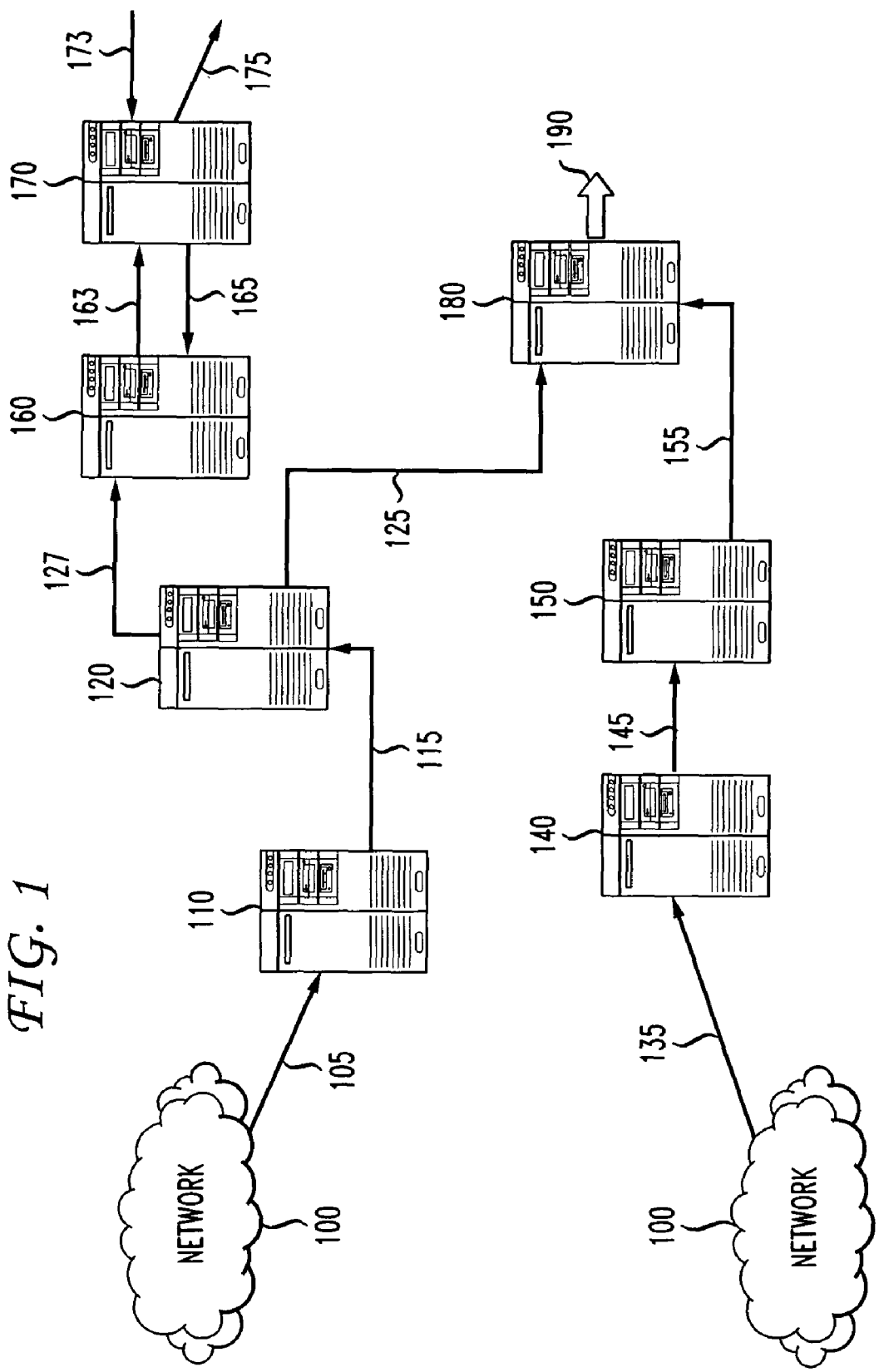
FIG. 1 shows a high level representation of a network infrastructure on which at least a part of the invention may be carried out.

The present invention provides a method of predicting the computational load of an application which comprises multiple processes. While the processes can be executed on a single computing device, typically, at least some of the processes are executed on a plurality of computing devices or servers. Thus, the invention typically proceeds by identifying processes which are part of the application and on which servers processes are being executed. The data flow from one server to another may also be identified and treated as, or be defined as, a process. The data flow may, for example, be data transferred over a network between a first computing device and a second computing device.

For each identified process, the input data load is measured. Input data load is a measure of an amount of resources used on a server or connection by a specific process of an application as a function of data inputted into the process. For example, the measure of resources used may comprise a measure of cpusecs, memory usage, network usage, or disk usage over time or at a specific moment in time. The input data load may be a measure of bytes of data, number of times the process is called, or another value indicative of an amount of data inputted into the resources. For example, if a process is initiated 685 times in a minute and causes 5280 k of memory to be used, then the input load is presently 685 times/minute and the resource usage, where the resource is 5280 k memory usage.

However, the 5280 k in this example may outputted from this process and be the input load on a second process. This load of 5280 k of data may be inputted into such a second process and would be defined as the input load of this process. Similarly, a network connection or other means of transport between a first computing device executing the first process, and a second computing device executing the second process, would have a load corresponding to the amount of data transferred.

By monitoring one or more resources over time and correlating resource usage to input load, a mathematical relationship between input load and resources in the form of a computational load characteristic can be surmised. The computational load characteristic may be any known measure of load on a computing device, including memory usage, disk usage, CPU usage, and network usage. The mathematical relationship may be any consistent mathematical relationship and may be a linear relationship, logarithmic relationship, or the like, between input load and computational load. The consistent mathematical relationship may be consistent only over a certain range of input load. For example, if input load is a measure of call volume on a server handling incoming VOIP calls, between 0 and 500 calls a minute may cause a linear relationship of calls to memory usage (a measure of computational load) on the server. However, above 500 calls the server may, for example, begin to allow less memory per call, and thus the relationship of calls to memory usage becomes roughly an inverse logarithmic function. Thus, the invention may proceed by establishing a mathematical relationship between input load and a computational load characteristic on either part or all of the data points.

Based on the established mathematical relationship, future computational needs can be predicted. Thus, if it is anticipated, by way of example, that incoming calls to the VOIP server will increase 3-fold in the next 18 months, an estimate of computational load characteristics for each process may be estimated, and computing resources can be provided ahead of time.

Still further, each computing device may be handling a plurality of processes, and each process may be executed for one or more applications. Thus, total computational load on a specific computing device may be measured by aggregating the computational load for each process being executed on this computing device. Similarly, total bandwidth usage may be estimated by aggregating a measure of computational load on a network connection between two servers.

FIG. 1 shows a high level representation of a network infrastructure on which at least a part of the invention may be carried out. The servers may be connected to a network 100 such as the Internet. In the present example, server 110 is connected to network 100 by connection 105. Connection 105 represents any flow of data from network 100 to server 110 and may be data flowing via a network connection such as an Ethernet connection. Other network connection and connections of FIG. 1 are defined in the same manner. Server 140 is connected to network 100 by connection 135.

In the configuration depicted in FIG. 1, server 110 executes a process of an application and transports the results or data representative of the process by connection 115 to server 120. For example, server 110 may receive raw data representative of a failed 911 call on a telephone network. In this example, server 110 may compile the raw data, such as by adding a timestamp, call length, call location, and other qualities associated with the phone call, and pass this information on to server 120 for logging. Server 120 may pass these data on to both server 180 by way of connection 125 and server 160 by way of connection 127. Server 160 may, for example, aggregate all such logs for internal company reference and receive logs from many servers and/or many applications. Server 160 may send data to server 170 via connection 163 and may receive a response back from server 170 via connection 165. Similarly, server 170 may communicate with another server by connections 173 and 175.

Server 180, in this example, receives data from server 120 via connection 125 and server 150 via connection 155. Moving backwards across the lower part of the chart, server 150 received data via connection 145 from server 140 which was in turn connected to network 100 by connection 135. A first application may be executed comprising multiple processes on at least the network path from server 110 to server 180 and/or server 110 to 170. A second application may be executed comprising multiple processes on at least the network path from server 140 to 180. Thus, server 180 may receive data from server 120 via connection 125 and from server 150 via connection 155. Server 180, in this example, may thus be aggregating data from two applications which may be substantially the same or may differ from each other. Server 180 may carry out the same process for both applications or may run a completely separate process for each application.

Again referring to FIG. 1, two applications will now be described in detail as they are executed over the network of servers depicted in the figure. The first application receives data from network 100 and collects network statistics therefrom. The input data flow traveling over connection 105 is network statistics. The volume of these data constitutes the work load on server 110 for this application. The process executed on server 110 as part of this first application produces data flow over connection 115, i.e., measurement information sent to server 120 which executes an aggregating process for reporting or alerting. This aggregating process executed on server 120 sends alerts via connection 125 to server 180 which, in this example, is a local alert collector. The aggregated data are also sent via connection 127 to server 160, on which exists a database, and a process is initiated whereby the aggregated data are stored in the database residing on server 160. Server 170, in the present example, is a web server, and when a user (such as a network administrator) interacts with the web server via connections 173 and 175, the web server (server 170) retrieves data from the database stored on server 160 via connections 163 and 165.

Continuing a description of the above, a second application may be executed in the following manner. Via connection 135, network 100 sends data to a consumer device, depicted as server 140 in FIG. 1. Via connection 145, the consumer device may send an alert to a company infrastructure server 150 which, in turn, sends data via connection 155 to server 180.

Server 180 may generate tickets 190 to be sent to those in the field to act upon. To avoid duplication of tickets, server 180 receives tickets from both the first and second applications, as described in the preceding paragraphs.

It should be understood by one having skill in the art that each server and each connection may be a plurality of servers or a plurality of connections acting in parallel. It should also be understood that each process executed on the servers may be one or more processes, and that multiple processes of an application may be executed on a server or group of servers acting in parallel. Each application can be executed on a single computing device or server, or on a plurality of computing devices or servers, and the terms "computing devices" and "servers" are used synonymously in this application. Still further, the layout of the servers in FIG. 1 is by way of example and not limitation. The invention may be carried out in any layout or configuration, applications may share or use separate servers, and applications may cross paths, join and separate, and so forth.

Figure 2:
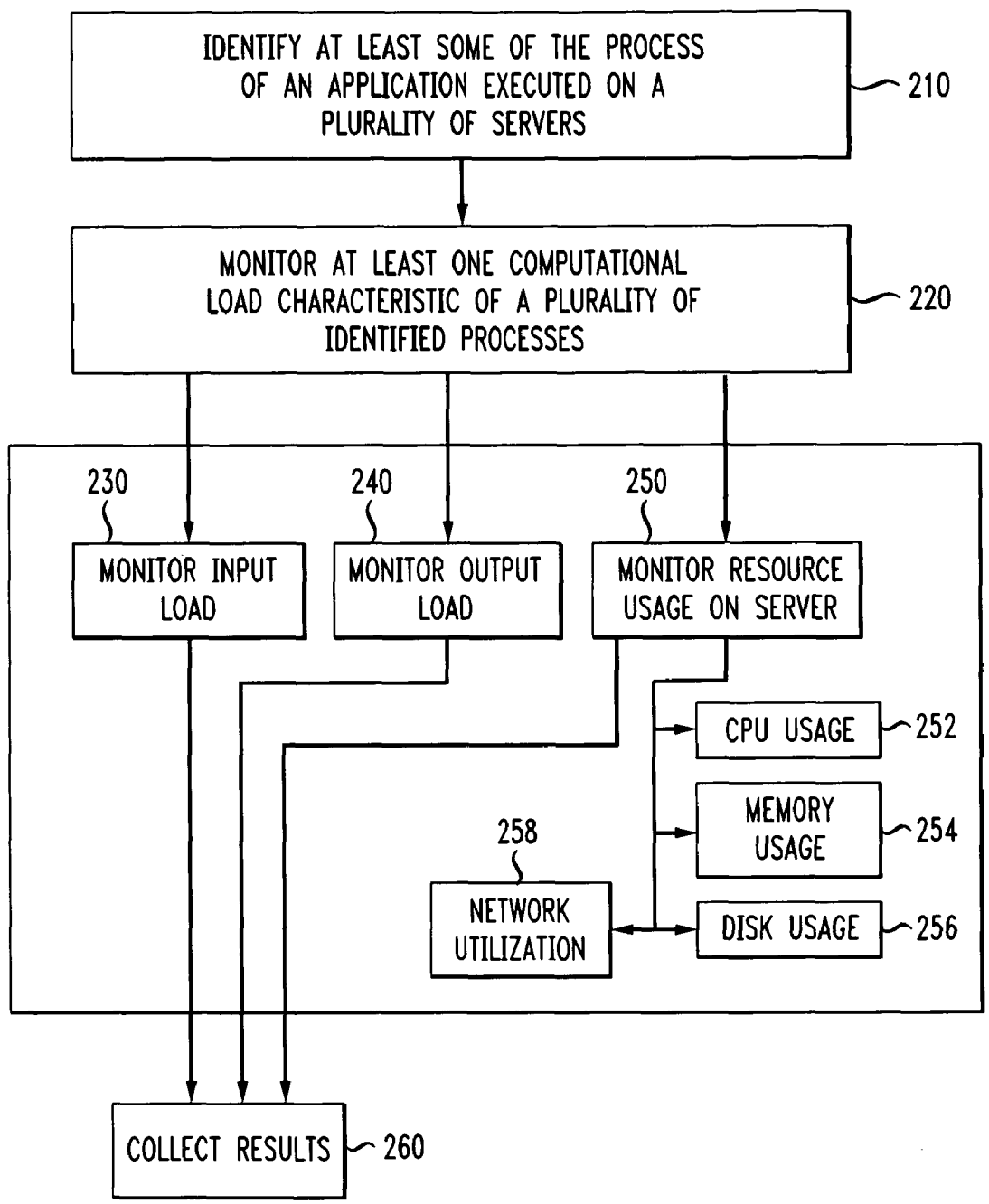
FIG. 2 shows a flow chart of a method of obtaining computational load characteristics of a plurality of processes of an application.

FIG. 2 shows a flow chart of a method of obtaining computational load characteristics of a plurality of processes of an application. In step 210, at least some of the processes of an application executed on a plurality of servers (such as is described above with reference to FIG. 1) are identified. In step 220, for processes identified in step 210, at least one characteristic of computational load is monitored. For each process being monitored, the monitored characteristic may be the same, or substantially the same, or may be a different characteristic. In order to carry out the invention, it is necessary only to identify and monitor one characteristic of two different processes which are part of the application, but a multitude of processes and characteristics may be monitored and used in the method steps of the invention. One or multiple paths may be taken from step 220 to each of step 230, monitoring of input load, step 240, monitoring output load, and/or step 250, monitoring resource usage of a process on an application. For all applications, at least an input load is monitored in step 230 for one process. Input load corresponds to an amount of data sent via a connection to a server for processing or usage thereof on the server. It is usually necessary to monitor input load at least once, and typically it is the first input into an application, so as to enable obtaining a mathematical relationship between input load and computational usage as practiced in the invention. Depending on the embodiment of the invention, it may or may not be desired to monitor output load in step 240. Output load corresponds to the data outputted from a process which is executed on a server. The output load of a first process may be the input load of a second process. If resource usage on a server for a process is being monitored in step 250, this may comprise monitoring CPU usage of the process in step 252, monitoring memory usage of the process in step 254, monitoring disk usage in step 256, and monitoring of network utilization in step 258. Any computational resource known in the art, including network throughput and the like, which is capable of monitoring, may be used with the invention. In step 260, the results are collected by any means known in the art, including storing in a database, viewing remotely, or taking down notes of the usage statistics monitored in the preceding steps.

Figure 3:
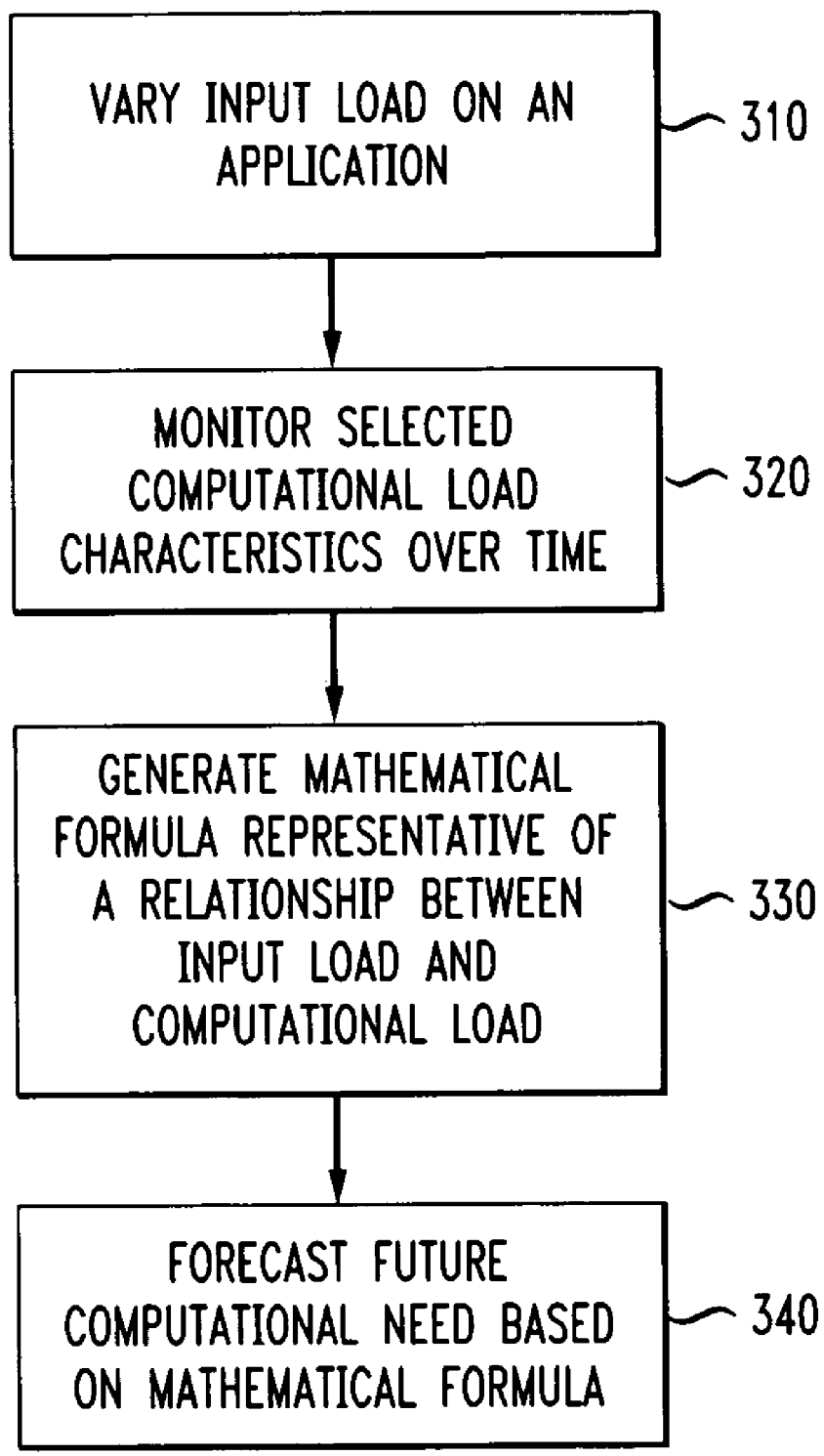
FIG. 3 shows a method of determining a mathematical relationship between the input load of an application and computational load of a process which is part of the application in an embodiment of the invention.

FIG. 3 shows a method of determining a mathematical relationship between the input load of an application and computational load of a process which is part of the application in an embodiment of the invention. The method depicted in FIG. 3 may be followed to determine a mathematical relationship for a plurality of processes concurrently or at separate times. In step 310 the input load on an application is varied. The input load may be varied over the natural course of executing an application or may be varied in a controlled environment. For example, if the input load is call volume, then the call volume may vary over time (i.e., being greatest during business hours and steadily decreasing during evening hours), or data may be generated simulating 10, 10,000, and 100,000 calls per minute. The computational load characteristics which were monitored for a process in steps 220, 230, 240, 250, 252, 254, 256 and/or 258 of FIG. 2 may be similarly monitored in step 320 of FIG. 3, and/or the collected results 260 may be utilized. However, in step 320 it may be desired to measure or utilize a subset of the computational load characteristics previously measured, such as if it is determined, for example, that a certain computational load characteristic measurement is not as useful as another measurement. For instance, a measurement of disk usage 256 on a server for a process of an application as input load varies may not be as useful as a measurement of memory usage 254 as input load varies. In step 330, a mathematical formula representative of a relationship between input load and computational load is generated. Such a formula may be a mathematical formula known in the art and need not be a written formula per se, but may be a quantifiable relationship between a measurement of input load and computational load. Typical mathematical relationships between input load and computational load are linear, exponential, or logarithmic. When input load is within a certain first range of values, the relationship may have a first mathematical formula, and when input load is within a second range of values, the relationship may have a second mathematical formula.

Figure 4A:
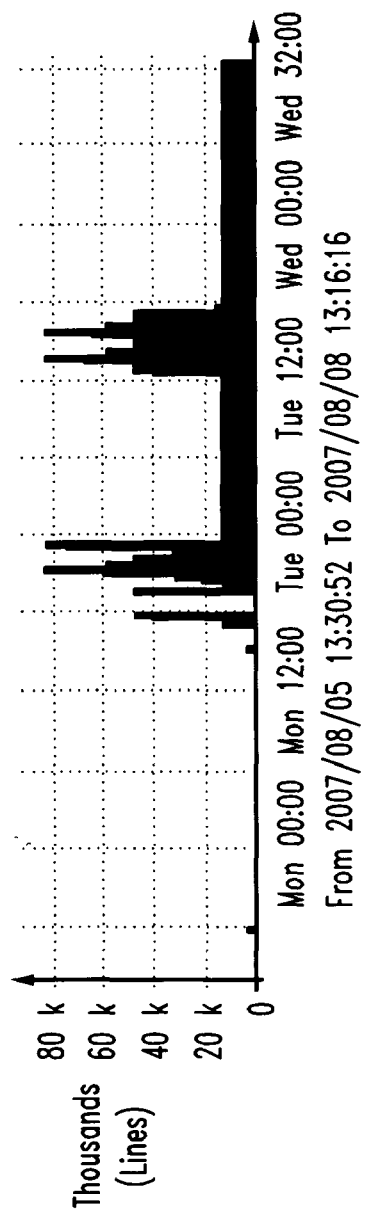
FIG. 4A is a graph of time vs. input load in an example of a method of determining a mathematical relationship between input load and a computational load characteristic in an embodiment of the invention.

FIG. 4A is a graph of time vs. input load in an example of a method of determining a mathematical relationship between input load and a computational load characteristic in an embodiment of the invention. In this graph, time is measured in (military) hours from Monday until Wednesday, and input load is measured in thousands of lines used in a VOIP network. In this example, the maximum amount of input load and average amount of input load are measured. An averaged or maximum measurement may be used in embodiments of the invention to determine a mathematical relationship between input load and computational load.

Figure 4B:
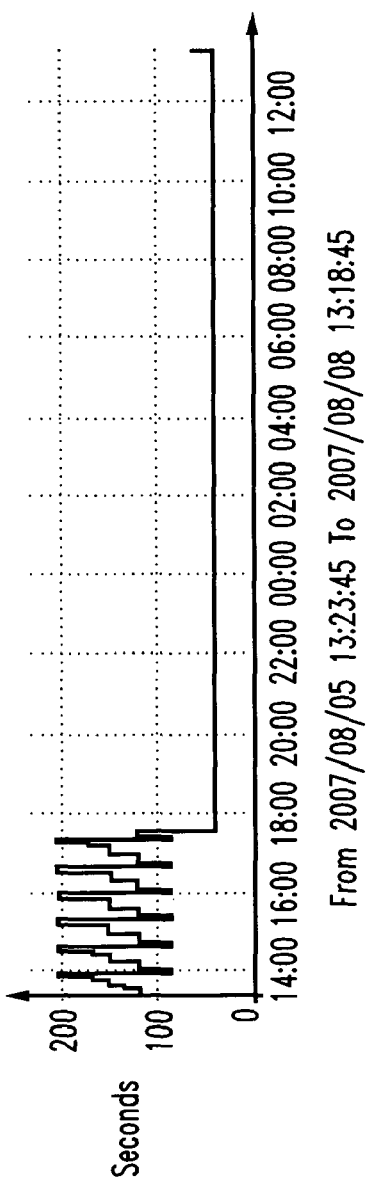
FIG. 4B is second graph of time vs. input load in an example of a method of determining a mathematical relationship between input load and a computational load characteristic in an embodiment of the invention.

FIG. 4B is a graph of time vs. computational load in an example of a method of determining a mathematical relationship between input load and a computational load characteristic in an embodiment of the invention. In this graph, time is measured in (military) hours, and computational load is measured in cpusecs per execution of each process on a server used as part of the application. Between 14:00 and 18:00 hours, in this example, the amount of time taken to carry out the functions of the process of the application (the computational load) significantly increases due to the increase of input load. By examining the data represented in FIGS. 4A and 4B, a linear mathematical relationship between input load and computational load can be established.

Figure 5A:
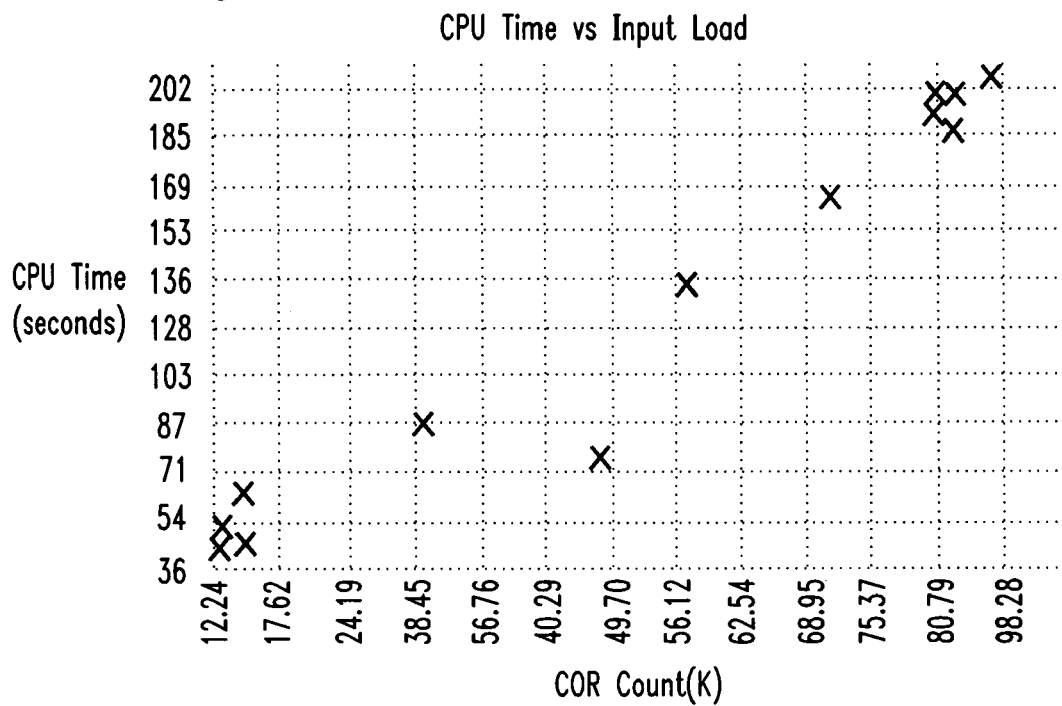
FIG. 5A is a graph of input load vs. computational load in an example of a method of determining a mathematical relationship between input load and a computational load characteristic in an embodiment of the invention.

FIG. 5A is a graph of input load vs. computational load in an example of a method of determining a mathematical relationship between input load and a computational load characteristic in an embodiment of the invention. In this example, a correlation is being made between input load (measured in thousands of calls at a moment in time) vs. computational load (CPU time in seconds for processes being run at the moment in time). A linear mathematical relationship is depicted and can be used to predict future computational needs, as will be explained below.

Figure 5B:
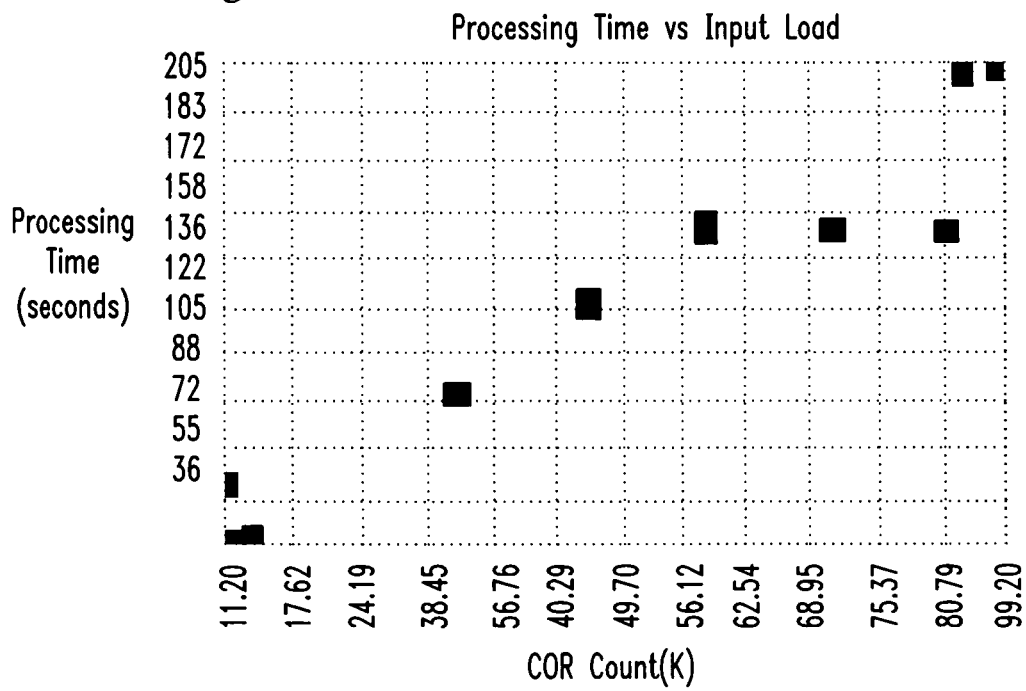
FIG. 5B is a second graph of time vs. computational load in an example of a method of determining a mathematical relationship between input load and a computational load characteristic in an embodiment of the invention.

FIG. 5B is a second graph of time vs. computational load in an example of a method of determining a mathematical relationship between input load and a computational load characteristic in an embodiment of the invention. In this example, a correlation is being made between input load (measured in thousands of calls at a moment in time) vs. computational load (processing time in seconds for processes being run at the moment in time). A linear or logarithmic function may be garnered over part or all of the data gathered to aid in predicting future computational needs.

Referring again to FIG. 3, in step 340 future computational need of is forecasted based upon the determined mathematical formula as shown in FIGS. 4A, 4B, 5A, and 5B, as well as step 330 of FIG. 3. In the invention, the future computational need of at least one process is determined based on a projection of input load. One having skill in the art should understand that numerous embodiments of the invention are possible, and computational need for a plurality of processes, or even an entire application, may be determined. Thus, for example, if input load is projected to double, and there is a linear relationship between input load and a computational load characteristic, then the required resources to handle the computational load will double. Thus, the appropriate infrastructure to handle the increased computational load (whether based on average, peak, or another measurement of computational load) can be put into place in a prospective manner.

The forecasting of computational load may be calculated based on trends. For example, a value for input load may be tracked over successful intervals of time, such as every 30, 60, 90, or 120 days. If computational load is on the increase, then, for instance, a user such as a system administrator may be alerted as computational load approaches a maximum or system performance decreases significantly. In another example, it may be desired to alert a user when computational load reaches or exceeds a set or predefined threshold. For example, if average computational load is over 80% over a period of time, then a user may be alerted that more computational resources will soon be needed.

Still further, the step of forecasting can occur on a server by calculating computational load for each process of an application executed on a server and combining the total computational load to come up with a total computational load. Thus, when multiple processes or applications are executed on a single computational device or server, the computational resources needed for the computational device or server can be calculated prospectively by inputting a projected input load for each application and/or process, or by monitoring each process and/or application executed on the computing device.

Often, each process is executed serially wherein, upon completion of one process, data are sent to a second process, which then executes and sends results to a third process, and so forth. Two or more processes may be used. However, it is also contemplated to practice the invention whereby at least some of the processes are executed in tandem, repetitively, and so forth.

Figure 6:
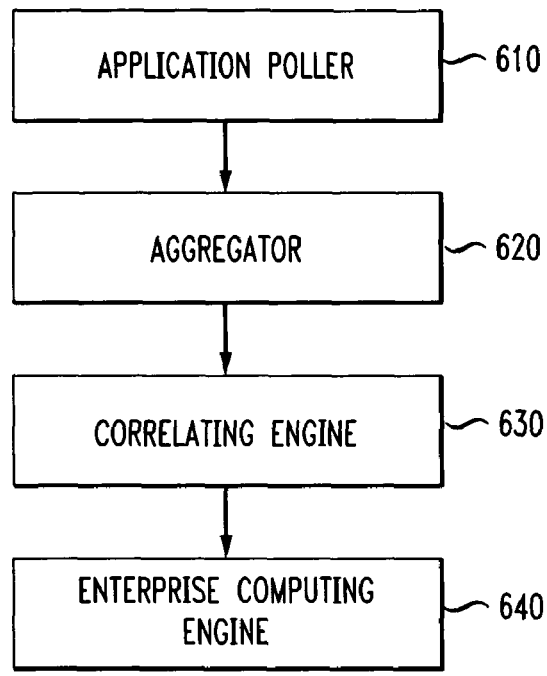
FIG. 6 shows a high level block diagram of a device on which embodiments of the invention may be carried out.

FIG. 6 shows a high level block diagram of a device on which embodiments of the invention may be carried out. The device is typically a computing device capable of making automated or semi-automated calculations. Automated calculations are calculations which are programmed once and carried out by the device without user intervention. Semi-automated calculations are calculations which are programmed but may or do require user input or configuration to complete the calculations. Still further, the device may be in whole or in part a human-conducted calculation used in the invention.

Application poller 610 is configured to receive computational load characteristic data (such as are described with reference to the method of the invention) from a plurality of processes of the application. The processes may be executed on one or more computing devices, and the poller 610 may be capable of receiving data from a plurality of applications. The poller 610 may receive load characteristic data in a variety of ways known in the art, including the use of network sniffers and computer usage statistic resources known in the art, including CPU monitors, memory monitors, disk usage monitors, and the like. Any key performance indicator may be polled to obtain the required data, and the poller 610 may comprise a software agent executed on individual servers or computing devices for such a purpose. The computational load statistics may be collected at a central location for passing on to the aggregator 620.

The aggregator 620 takes the computational load data received by the application poller 610 and conducts mathematical calculations on the polled data, such as identifying average and/or peak computational usage data for a polled computational resource. The aggregator 620 passes the results of at least its own calculations to a correlating engine 630. The aggregator 620 may also pass on part or all of the data received from the poller 610 to the correlating engine 630, such as especially input load data.

The correlating engine 630 is configured to establish a mathematical relationship, such as a linear, logarithmic, or exponential relationship between input load and computational load, as is represented by the mathematical calculations carried out by the aggregator 620. The relationship may be formed by any means known in the art, such as a best fit model, or by manual entry or estimation on the part of a computing device or human. The resulting relationship is used by an enterprise computing engine 640. The enterprise computing engine 640 is configured to forecast future computational need for at least one process of the plurality of processes based on the established mathematical relationship, as described in reference to the method of the invention.

Figure 7:
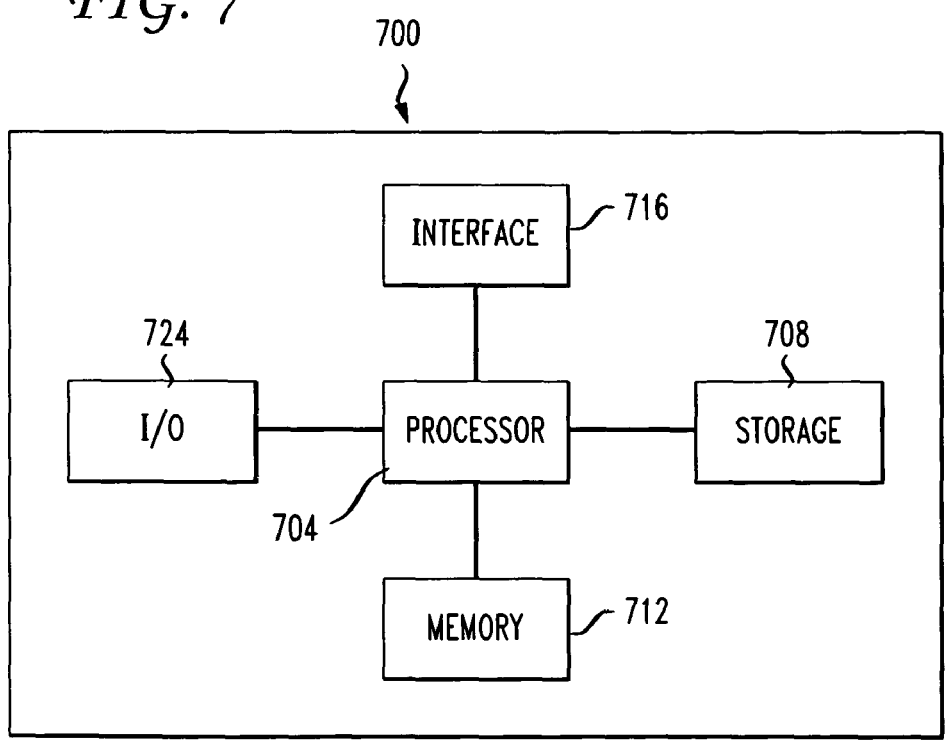
FIG. 7 shows a high level block diagram of a computer that may be used to carry out the invention.

FIG. 7 shows a high-level block diagram of a computer that may be used to carry out the invention. Computer 700 contains a processor 704 that controls the overall operation of the computer by executing computer program instructions which define such operation. The computer program instructions may be stored in a storage device 708 (e.g., magnetic disk, database) and loaded into memory 712 when execution of the computer program instructions is desired. Thus, the computer operation will be defined by computer program instructions stored in memory 712 and/or storage 708, and the computer will be controlled by processor 704 executing the computer program instructions. Computer 700 also includes one or a plurality of input network interfaces for communicating with other devices via a network (e.g., the Internet). Computer 700 also includes one or more output network interfaces 716 for communicating with other devices. Computer 700 also includes input/output 724 representing devices which allow for user interaction with the computer 700 (e.g., display, keyboard, mouse, speakers, buttons, etc.). One skilled in the art will recognize that an implementation of an actual computer will contain other components as well, and that FIG. 7 is a high level representation of some of the components of such a computer for illustrative purposes. It should also be understood by one skilled in the art that the method and devices depicted in FIGS. 2 and 3 may be implemented on a device such as is shown in FIG. 7.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention, and that various modifications may be implemented by those skilled in the art without departing from the scope and spirit of the invention. Those skilled in the art could implement various other feature combinations without departing from the scope and spirit of the invention.

We claim:

1. A method for predicting future computational need for an application, the application comprising a plurality of processes and wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein a plurality of the processes is executed serially.

2. A method for predicting future computational need for an application, the application comprising a plurality of processes and wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein at least one computing device executes a process for multiple applications.

3. The method of claim 2, wherein an aggregate value of computational load is measured on the at least one computing device based on a computational load of each application of the multiple applications.

4. A method for predicting future computational need for an application, the application comprising a plurality of processes wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein the monitoring comprises monitoring of average computational load.

5. A method for predicting future computational need for an application, the application comprising a plurality of processes wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein the monitoring comprises monitoring of peak computational load.

6. A method for predicting future computational need for an application, the application comprising a plurality of processes wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein the mathematical relationship is a logarithmic relationship.

7. A method for predicting future computational need for an application, the application comprising a plurality of processes wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process;
forecasting a future computational need for at least one of the first process and the second process, based on the established mathematical relationship; and
alerting a user when a monitored computational load characteristic exceeds a predefined threshold.

8. A method for predicting future computational need for an application, the application comprising a plurality of processes wherein at least one first process of the application is executed on a first computing device and at least one second process of the application is executed on a second computing device the method comprising:
monitoring a computational load characteristic of the first process and of the second process;
establishing a mathematical relationship between input load and the computational load characteristic for each of the first process and the second process; and
forecasting a future computational need for at least one of the first process and the second process, based on the established mathematical relationship;
wherein the computational load characteristic is selected from the group consisting of cpusecs, memory usage, network usage, and disk usage.

9. A device for predicting future computational need for an application executed across a plurality of computing devices, the device comprising:
an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein the plurality of processes is executed serially.

10. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein at least one computing device executes a process for multiple applications.

11. The method of claim 10, wherein an aggregate value of computational load is measured on a the at least one computing device based on computational load of each application of the multiple applications.

12. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein the mathematical calculations comprise a computation of average computational load.

13. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein the mathematical calculations comprise a computation of peak computational load.

14. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein the mathematical relationship is a linear relationship.

15. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein the mathematical relationship is a logarithmic relationship.

16. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations;

an enterprise computing engine configured to forecast future computational need for at least one of the first and second processes based on the established mathematical relationship; and means for alerting a user when a monitored computational load characteristic exceeds a predefined threshold.

17. A device for predicting future computational need for an application executed across a plurality of computing devices, the device comprising:

an application poller configured to receive computational load characteristic data from a plurality of processes of the application, wherein at least a first process of the plurality of processes is executed on a first computing device and at least a second process of the plurality of processes is executed on a second computing device;

an aggregator configured to conduct mathematical calculations on the computational load characteristic data;

a correlating engine configured to establish a mathematical relationship between input load and results of the mathematical calculations; and an enterprise computing engine configured to forecast future computational need for at least one of the first and second processes based on the established mathematical relationship;

wherein said computational load characteristic is selected from the group consisting of cpusecs, memory usage, network usage, and disk usage.

* * * * *